United States Patent Office 2,858,429
Patented Oct. 28, 1958

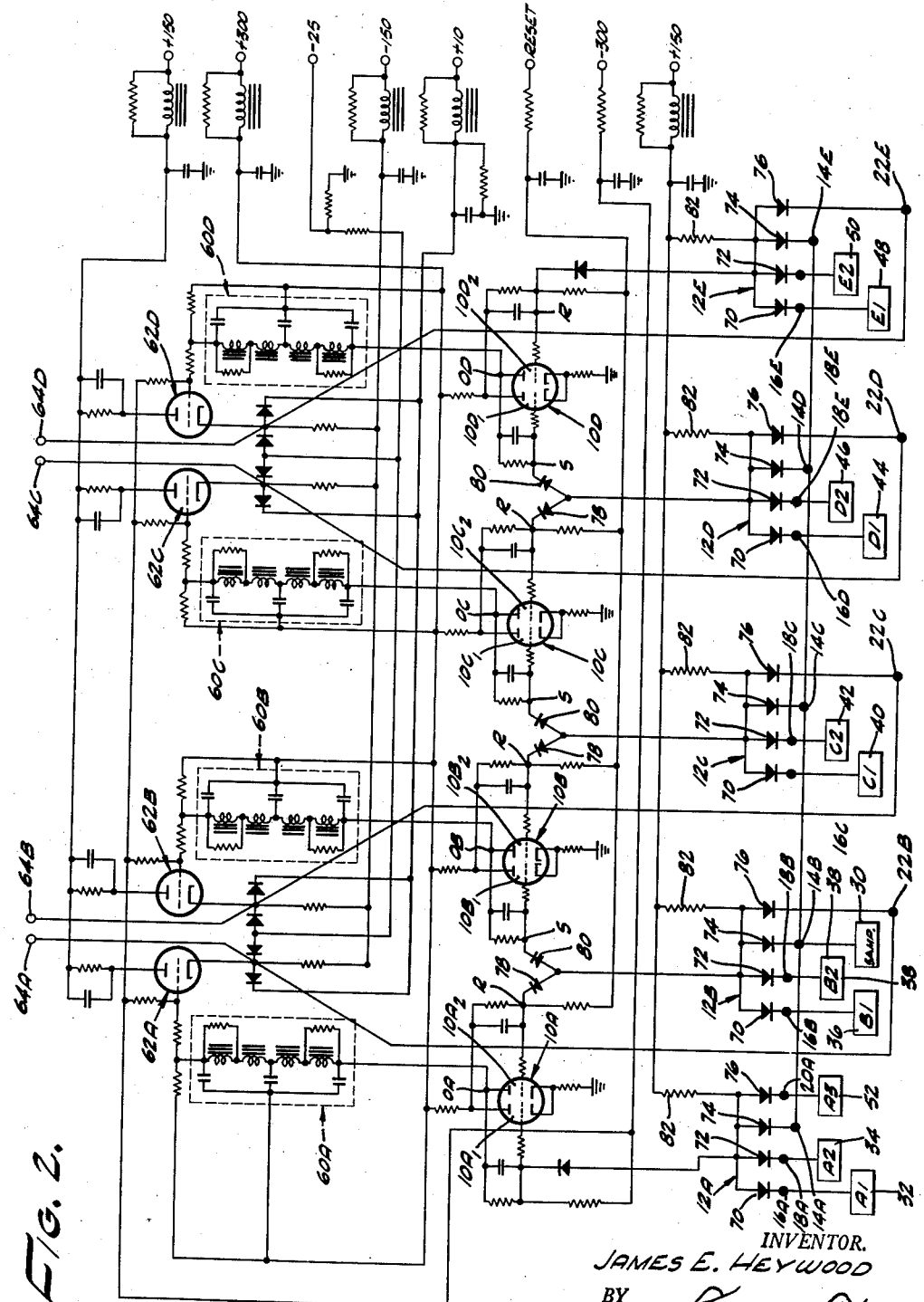

2,858,429

GATED-DELAY COUNTER

James E. Heywood, Palo Alto, Calif., assignor, by mesne assignments, to General Electric Company, New York, N. Y., a corporation of New York Application December 28, 1953, Serial No. 400,645

5 Claims. (Cl. 250—27)

This invention relates to electronic counters, and, more particularly, is an improvement in electronic counters of the type employing flip-flop circuits. In the construction of apparatus such as information handling machines or computers and the like, it is often desirable to have a unit which provides a sequence of pulses in response to different signals or groups of signals occurring either at fixed or at random times from several independent signal sources. Furthermore, oftentimes the number of signals available for the sequencing action may be different for each sequence. Known types of counters have sought to be used in order to provide apparatus which can perform the required operation. These are not always satisfactory since they are usually overly dependent on the pulse shapes and amplitudes of the incoming signals and are not simply adapted to the applications wherein different advancing signals are required dependent upon the state of the counter.

Accordingly, it is an object of the present invention to provide a gated-delay counter which can be responsive to the occurrence of different signals for each one of the "n" states of the counter.

It is a further object if the invention to provide a counter which is novel and useful and simple in construction.

It is still a further object of the present invention to provide a sequencing unit in which one or more of the "n" output terminals are energized at one time and the energized state is moved from terminal to terminal in response to external stimuli which are not necessarily the same in number or repetitive in time of occurrence.

These and other objects of the invention are achieved by providing a circuit wherein a plurality of bistable flip-flop circuits are employed, each one of which has a set input, a reset input, and an output terminal which is excited when a pulse is applied to the set input terminal. A plurality of And gates are provided of the type which only allows an output to occur upon the simultaneous presence of signals to all its inputs. One input to all the And gates may be connected in common to a source of sample or timing pulses. Other inputs of each one of the And gates may be connected to the various signal sources, the simultaneous presence of which is desired to advance the counter in each instance. Another input to each And gate occurs from a delay network which has its input connected to the output of a flip-flop. The output from each And gate is applied to the reset input of the flip-flop, from which the And gate derives its output, and also to the set terminal of a succeeding flip-flop circuit. The delay networks provide a delay which exceeds the duration of a sample pulse.

Accordingly, upon the occurrence of the desired advancing signals to an And gate, a sample pulse, and an output from a preceding flip-flop, that And gate provides an output to reset the flip-flop, from which it derives an output, to set the succeeding flip-flop, which, in turn, provides an output to the succeeding And gate as well as the succeeding output terminal after the sample pulses have subsided.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which:

Figure 2 shows the circuit for the embodiment of the invention shown in Figure 1.

Figure 1:
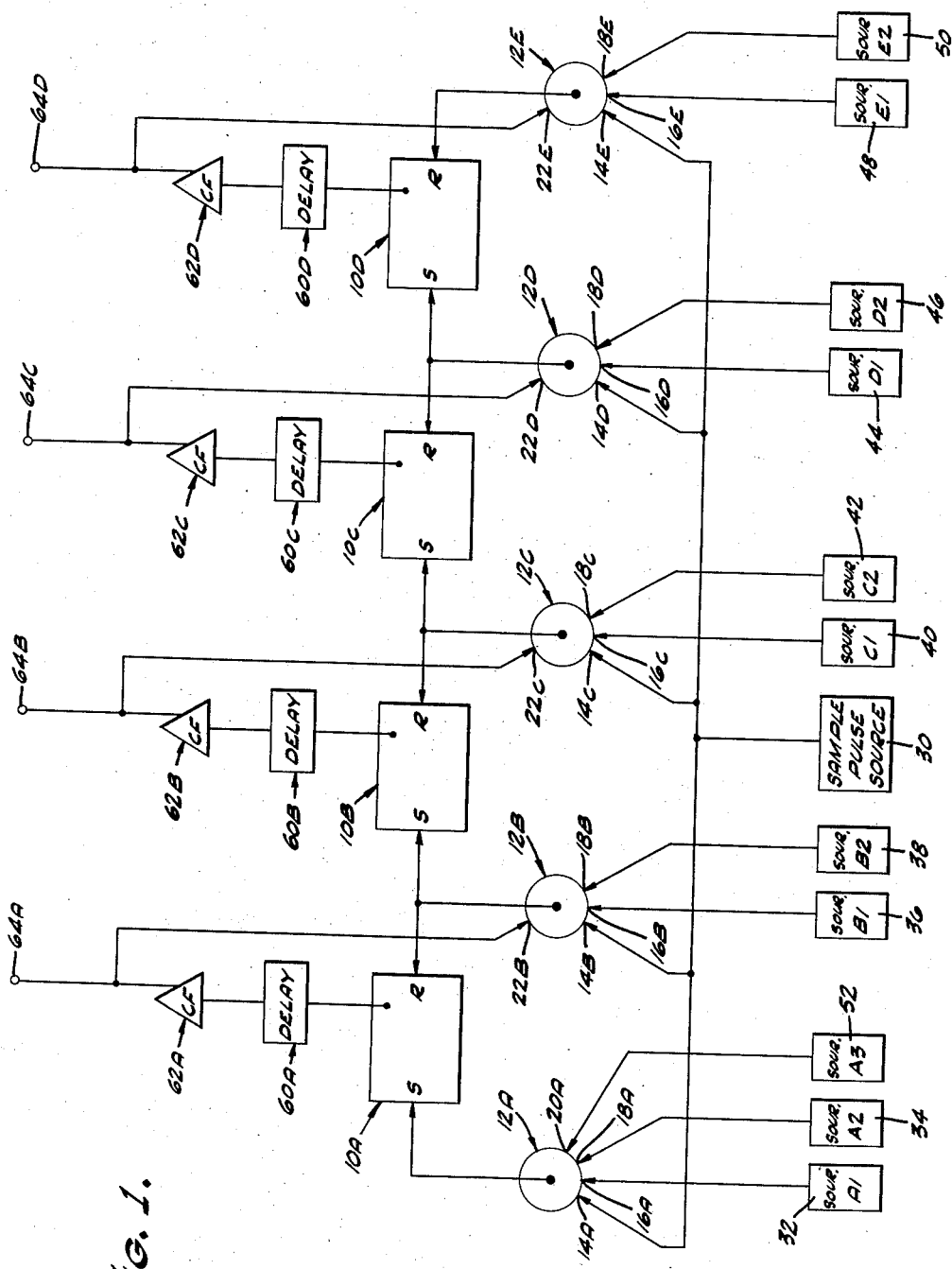
Figure 1 is a schematic diagram of an embodiment of the invention.

Referring now to Figure 1 of the invention, each flip-flop circuit 10A—10D, which is employed in the counter, has a set and a reset input terminal and an output terminal OA—OD. Each of the And gates 12A—12E have a first input 14A—14E which is connected in common and, in turn, to a source of sampling pulses 30. The other inputs 16A—16E, 18A—18E are connected to respective sources of advancing pulses 32—50. The number of these other inputs may be as many or as few as are desired. The first And gate 12A in the chain obviously may not have the output from a flip-flop applied thereto, as do the remaining And gates in the chain. A supplementary starting pulse source 52 may be provided. However, if desired, the chain may be completed and made into a ring by eliminating the last And gate 12E and connecting the output of the fourth flip-flop to the input of the first And gate, or by providing another flip-flop stage and having its output go to the input to the first And gate. These and other schemes will be readily apparent to one skilled in the art from the teachings found in the subject application.

Each flip-flop provides an output only upon the application of a pulse to its set input. This output is applied to a delay network 60A—60D and then through a cathode follower circuit 62A—62D to an output terminal 64A—64D. The output from each delay line is also applied to an input 22B—22E of a succeeding And gate. The delay network and cathode follower insure a direct, coupled connection between the output of the flip-flop and the input to the And gate. Accordingly, when an And gate receives an output from a delay line it is primed and is ready to provide an output upon the application of the other required inputs. The delay interval of the delay networks is made long enough to permit the sampling pulse and all other pulses to subside before its output is applied to an And gate in order not to trigger any succeeding And gates and their associated flip-flops out of turn.

It will be appreciated that the application of the advancing pulses can be random, except that they must occur within the duration of a sampling pulse. As many flip-flops and And gates may be employed as are required in order to sequence a given program through a computer. Each time an And gate provides an output, it resets the preceding flip-flop as well as sets the succeeding flip-flop. Thereby, the counter is always in condition to accept the next group of advancing signals as soon as an output from the flip-flop is received by the And gate. The sampling pulse source may be also considered as a timing pulse source. It can be omitted and the system will operate only upon the coincidence of the other inputs.

Another feature of the invention is that, if desired, two or more flip-flops may be initially triggered to be in their set condition, making available an output. The system will then operate as described above, but advancing outputs, in that instance, may be obtained simultaneously from a number of output terminals to enable a number of different operations.

Referring now to Figure 2 of the drawing, it will be seen that the flip-flops employed are the well known Eccles-Jordan type of trigger circuit, wherein the anodes and control grids of two electron tubes are cross connected through parallel resistor condenser networks. This, in combination with the operating potentials applied, provides a flip-flop circuit which has two stable conditions: one, with current flowing in one tube and the other cut off, and the other, with the condition in reverse. Flip-flops of this type will be found described in Terman's Radio Engineering, second edition, on pages 595–597, and published by the McGraw-Hill Book Company. Similar reference numerals have been applied to the structures in Figure 2 which are represented schematically in Figure 1. The input terminals to the trigger circuits are labelled with "S" and "R" to correspond to the set and reset terminals shown in the schematic diagram of Figure 1. The application of a positive pulse to a set terminal triggers the tube $10A_1$—$10D_1$, the grid of which is connected thereto into conduction. The other tube $10A_2$—$10D_2$, accordingly, is driven to non-conduction, and its anode voltage rises up substantially to the operating potential level. The output OA—OD is taken from the anode of the tube $10A_2$—$10D_2$ which goes positive when input is applied to the set terminal. This positive pulse output is applied to a well known type of delay network 60A—60D, which consists of lumped constants of the inductance and capacitance type. These provide a desired delay to the output positive-going pulse. This pulse is applied to the grid of a cathode follower tube 62A—62D, and an output is taken from the cathode follower tube and applied to an input 22B—22E to the succeeding And gate 12B—12E. Output is also taken to an output terminal 64A—64D from the cathode of the cathode follower. Each of the And gates 12A—12E consist of a plurality of diodes (70—76, for example) having their respective cathodes coupled to the respective pulse sources 30, 36, 38, 62A and their anodes connected in common to: (1) two diodes 78, 80, the outputs of which are respectively applied to the reset terminal of the preceding flip-flop circuit 10A and the set terminal of the succeeding flip-flop circuit 10B; and (2) through a resistor 82 to a source of positive voltage. In the standby condition, current flows from the voltage source through each one of the diodes 70—76. There is a voltage drop across the resistor 82 which is determined by the amount of current being drawn by the And gate diodes. A positive pulse applied to less than all the cathodes of the And gate diodes will not change the potential at the common junction of the anodes to a considerable extent, since current is still flowing through the diode to which a pulse is not applied to maintain the potential at the common junction point low. However, when positive signals are applied to all the cathodes of the And gate diodes, all the diodes cease conduction, and the common junction point, accordingly, rises up toward the potential of the voltage source. Accordingly, a positive pulse is developed at the common junction point, which, in turn, is applied to the set and reset terminals of the flip-flop circuits.

It should be noted that the output of each flip-flop circuit is direct coupled through the delay network and the cathode follower to the succeeding And gate. This primes and maintains primed this succeeding And gate so that upon receipt of the remaining required pulses the And gate will provide an output.

Accordingly, there has been shown and described hereinabove a novel and useful gated-delay counter which can respond to any number of inputs to provide an output in each instance. These inputs need not be regular in occurrence. The counter may be made as large or as small as required; furthermore, it may be operated to simultaneously provide more than one output.

I claim:
1. A gated-delay counter comprising a plurality of flip-flop circuits each having a set and a reset input and an output, a plurality of And gates each having at least three inputs, means coupling one input from each And gate to a common terminal, a plurality of coupling means each of which couples an output from each flip-flop circuit to an input of a different And gate, means coupling the output of each And gate to the reset input of the flip-flop circuit to the output of which it is coupled and to the set input of a different flip-flop circuit, a source of sampling pulses, means to apply sampling pulses from said source to said common terminal, a plurality of different sources of advancing pulses, and means to apply advancing pulses from a different one of said advancing pulse sources to the remaining input of each of said And gates to derive outputs from said flip-flop circuits in sequence.

2. A gated-delay counter as recited in claim 1 wherein each of said means to couple an output from each flip-flop circuit to an input of a different And gate includes a delay network.

3. A gated-delay counter as recited in claim 2 wherein the delay interval of said delay network is greater than the duration of said sampling pulse.

4. A gated-delay counter comprising a plurality of bistable flip-flop circuits each having a set and a reset input and an output excited upon application of a pulse to said set input, a plurality of delay networks each of which is coupled to the output of a different flip-flop, and a plurality of And gates of the type requiring a coincidence of inputs to provide an output, each of said gates having a sample pulse input, an advancing pulse input and an input coupled to a different one of said delay networks, each of said gates having its output coupled to the reset input of the flip-flop circuit from which it derives an output and to the set input of a different one of said flip-flop circuits, a first of said plurality of And gates having only a sample pulse input and an advancing pulse input and its output coupled to the set input of a first of said flip-flops, a plurality of different sources of advancing pulses, and means to apply the output of a different one of said plurality of different sources to the advancing pulse input of each of said And gates.

5. A gated-delay counter as recited in claim 4 wherein each of said delay networks has a delay interval greater than the duration of a sample pulse.

References Cited in the file of this patent

UNITED STATES PATENTS

| | | |
|---|---|---|
| 2,384,379 | Ingram | Sept. 4, 1945 |
| 2,557,729 | Eckert | June 19, 1951 |
| 2,734,684 | Ross | Feb. 14, 1956 |
| 2,735,005 | Steele | Feb. 14, 1956 |
| 2,758,787 | Felker | Aug. 14, 1956 |

FOREIGN PATENTS

| | | |
|---|---|---|
| 1,041,803 | France | June 3, 1953 |

OTHER REFERENCES

Proceedings of the I. R. E. Oct. 1953, pages 1313–1320.